May 21, 1957 E. A. GOLDBERG 2,792,988
ELECTRONIC INTEGRATOR
Filed April 28, 1951
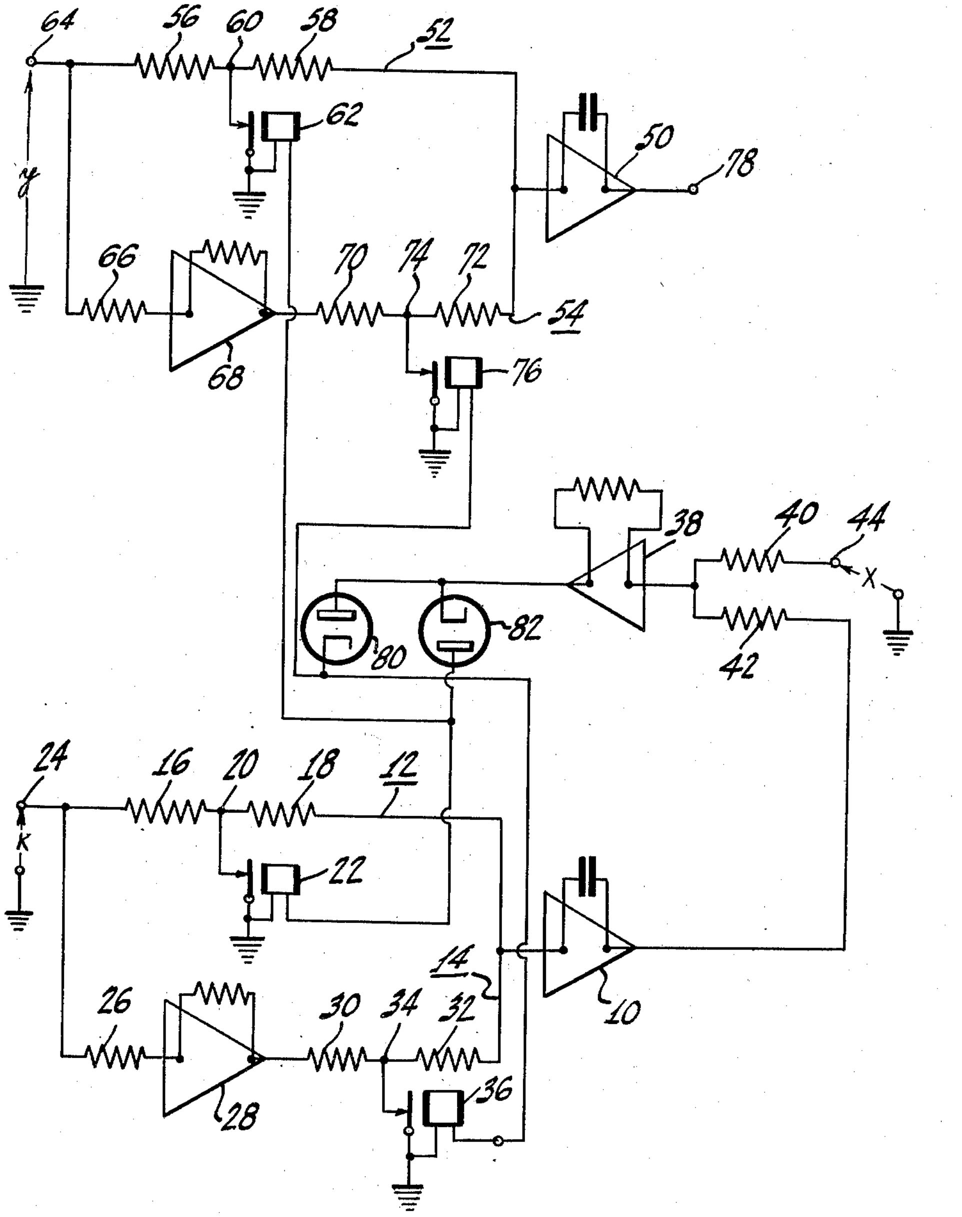
INVENTOR
EDWIN A. GOLDBERG
BY Morris A. Rabkin
ATTORNEY

United States Patent Office 2,792,988

Patented May 21, 1957

2,792,988

ELECTRONIC INTEGRATOR

Edwin A. Goldberg, Princeton Junction, N. J., assignor, by mesne assignments, to the United States of America as represented by the Secretary of the Navy Application April 28, 1951, Serial No. 223,587

10 Claims. (Cl. 235—61)

This invention relates to electronic computers. More particularly, this invention relates to an analogue type of electronic integrator.

It is an object of this invention to provide an analogue type of electronic integrator which integrates one variable with respect to another variable, the other variable not necessarily being time.

It is another object of this invention to provide an analogue type of electronic integrator which integrates one variable voltage with respect to another variable voltage.

It is still another object of this invention to provide a novel and useful type of electronic integrator.

These and other objects of my present invention are achieved by first establishing a first variable voltage and a second variable voltage respectively representative of the first and second variable quantities. A constant voltage is integrated by a first integrating amplifier for an interval required for the output of this first integrating amplifier to equal the value of the second variable voltage. Means are provided to permit the first variable voltage to be applied to a second integrating amplifier to be integrated thereby during this same interval. The output of the second integrating amplifier is then an integral which is representative of the integral of the first variable quantity with respect to the second variable quantity.

The novel features of the invention as well as the invention itself, both as to its organization and method of operation, will best be understood from the following description, when read in connection with the accompanying drawing, in which there is shown a schematic diagram of an embodiment of my invention.

Referring now to the drawing, which shows an embodiment of my invention in schematic form, a first integrating amplifier 10 has two parallel inputs 12, 14. One of the inputs 12 consists of two series-connected resistors 16, 18 of equal value. At the junction 20 of the two series-connected resistors 16, 18, the contacts of a normally closed relay 22 connect this junction to ground. The second input 12 to the first integrating amplifier 10, which connects the same input terminal 24 to the first integrating amplifier as do the two series-connected resistors, includes a resistor 26 in series with a phase reversing amplifier 28. In series with the output of this phase reversing amplifier 28 are two series-connected resistors 30, 32 coupling said output to the input of the integrating amplifier 10. The junction 34 of these two series-connected resistors is short-circuited to ground through the contacts of a second normally closed relay 36. It will be appreciated that, when the contacts of both relays 22, 36 are in the normally closed position as shown, the input to the first integrating amplifier is grounded and is zero.

The output of the first integrating amplifier 10 is connected to a summing amplifier 38 through an input resistor 42. Another input resistor 40 is connected to the summing amplifier from a terminal 44. This terminal 44 has applied thereto a second variable in the form of a variable voltage which is designated as $x$. The two inputs to the summing amplifier 38 are applied so that they oppose one another. The output of the summing amplifier is their amplified resultant. The voltage applied to the two inputs 12, 14 of the first integrating amplifier is a constant voltage $k$. The value of $k$ determines the speed of operation of the system. Other than this, its value is not too material.

A second integrating amplifier 50 is provided which is similar to the first integrating amplifier 10 and has a similar pair of inputs 52, 54 connecting a terminal 64 to the integrating amplifier 50. A first variable in the form of a variable voltage which is designated as $y$ is applied to this terminal 64. One of the pair of inputs 52 consists of two similarly valued series-connected resistors 56, 58 connected between the terminal 64 to which voltage $y$ is applied and the second integrating amplifier 50. The contacts of a first normally closed relay 62 connect the midpoint 60 of the two series-connected resistors 56, 58 to ground. The other input 54 of the second integrating amplifier, which is connected between the terminal 64 to which the voltage $y$ is applied and the second integrating amplifier 50, consists of a series resistor 66 connected to the input of a phase reversing amplifier 68 and two series connected resistors 70, 72 connecting the output of the phase reversing amplifier 68 to the input to the second integrating amplifier. The junction 74 of these two series connected resistors is short circuited to ground through the normally closed contacts of a second normally closed relay 36. The second integrating amplifier output is applied to an output terminal 78.

The output of the summing amplifier 38 is connected, through a first diode 80, to the relay coils of both the second normally closed relays 36, 76 which short-circuit the integrating amplifier inputs which include the phase-reversing amplifiers 28, 68. A second diode 82 is connected from the output of the summing amplifier 38 to the relay coils of both of the first normally closed relays 22, 62 in the inputs to the integrating amplifiers. The first diode 80 is connected to pass currents of a polarity opposite to the currents passed by the second diode 82.

The phase reversing amplifiers, the summing amplifier and the integrating amplifiers are all high gain D. C. amplifiers and may be of the type described in an article by John R. Ragazzini et al., entitled "Analysis of Problems in Dynamics by Electronic Circuits," published in the Proceedings of the I. R. E. for May 1947, pages 442 through 453, or those described in an article by Edwin A. Goldberg entitled "Stabilization of Wide-Band Direct-Current Amplifiers for Zero and Gain," published in the RCA Review for June 1950, pages 296 through 300. A typical value which may be used for each of the series-connected resistors in each pair of the integrating amplifier inputs is ½ megohm. The resistor used as a feedback resistor for the phase reversing amplifiers is 1 megohm and the resistor used for the input to each of the phase reversing amplifiers should also have a value of one megohm in order to establish the overall gain from input to output of the phase reversing amplifier as unity. The resistors used for the inputs to the summing amplifier should have a value of one megohm and the value of the feedback resistor should be determined in accordance with the requirements of current for the operation of the relay coils. However, this amplifier gain should be high since it assists in determining the sensitivity of the system. The feedback condenser for the integrating amplifiers may have a value of 1 mfd. The above values are those of an operative embodiment and are not to be taken as a limitation upon the invention. The values indicated provide a scale factor of one for the system. The values of the resistors in the input circuits may be varied in a manner well known to the art to provide other scale factors.

For an understanding of the operation of the embodiment of the invention shown, it should be borne in mind that an integrating amplifier, in the absence of an input, maintains an output in accordance with the output at the time the last input was removed therefrom. This situation obtains because of the feedback condenser used with the integrating amplifier, which, if it has a very low leakage resistance, maintains its charge and thereby provides an input to the integrating amplifier which maintains the output. Now, to illustrate the operation of this system, consider that the first integrating amplifier provides an output which is equal to the variable voltage $x$. When this situation obtains, there is no output from the summing amplifier and all the relay contacts remain closed, so that there is a zero input to the integrators. Assume that the voltage $x$ changes by an amount $\Delta x$. At this time the summing amplifier 38 provides an output which, in view of its phase reversing action as a D. C. amplifier, is negative. As a result, the coils of both the first relays 22, 62, which are in the inputs not including the phase reversing amplifier, have a current impressed thereon which causes them to operate. The remaining relays are not operated, since the diode connected to their coils will not conduct a negative current. Opening of the first relay contacts in the input to the first integrating amplifier permits the constant voltage $+k$ to be applied to the integrator. Similarly and simultaneously, a voltage $+y$ is applied to the second integrating amplifier. The output voltage of the first integrating amplifier changes, and when it has changed by an amount equal to $\Delta x$, its output is $x+\Delta x$ and the output of the summing amplifier is accordingly reduced to zero. At that time the operated relays are released, thus short circuiting the inputs to the first and second amplifiers and terminating the application of the voltage $+k$ to the first integrating amplifier and $+y$ to the second integrating amplifier.

Let
$\Delta x$=amount by which $x$ is changed
$k$=the input voltage to first integrator
$\Delta t$=the time duration relays 22 and 62 are open
$\Delta Z$=the change in output voltage of second integrator
$y$=the input to second integrator
$C$=integration constant Since the voltage $k$ is integrated for a time $\Delta t$ to equal $\Delta x$, $$\Delta t=\frac{\Delta x}{k} \qquad (1)$$

Similarly, the output of the second integrator equals the voltage $y$ integrated for a time $\Delta t$, $$\Delta Z=y\Delta t \qquad (2)$$

It can therefore be seen, that $$\Delta Z=y\frac{\Delta x}{k} \qquad (3)$$

From the above, it may readily be seen that $$Z=\frac{1}{k}\int y dx+C \qquad (4)$$

The polarity reversing amplifiers and the relays connected to the inputs in which these polarity reversing amplifiers are found are provided in order that the system shown may function for decreasing values of $x$ or $-\Delta x$. The first and second diodes serve to make these relays polarity sensitive. It should be apparent that upon a decrease in $x$ equal to $-\Delta x$, the second relays are operated, a negative voltage is consequently applied to both integrators and both outputs are decreased until $-k\Delta t=-\Delta x$. At this time the value of $y$ has decreased so that $$-\Delta z=y\Delta t \text{ and } Z=\frac{1}{k}\int y dx+C$$

By the addition of other units similar to the $y$ input unit, other integrations relative to $x$ may be performed without duplicating the $k$ and $x$ input unit. In place of each one of the diodes a trigger circuit may be used which is sensitive to the polarity of the summing amplifier output. Accordingly, one trigger circuit may be triggered by a positive output, returning to its starting condition when the summing amplifier output is zero, and the other trigger circuit is similarly triggered by a negative output. The respective relays are operated by triggering of the respective trigger circuits and are released when the trigger circuits return to their starting position.

It may therefore be seen from the above that there has been described and shown an analogue type of electronic integrator which integrates one variable with respect to another variable, the other variable not necessarily being time. This novel integrator system also integrates one variable voltage with respect to another variable voltage and permits expansion, so that several variable voltages may be integrated simultaneously with respect to the other variable voltage.

What is claimed is:

1. A system for integrating one variable voltage with respect to a second variable voltage comprising means to produce switching signals for an increment of time proportional to an increment in said second variable voltage, said signal producing means including a feedback means having a switching means responsive to said switching signals, and means to integrate said first variable voltage during said increment of time including switching means responsive to said switching signals whereby the result of said last named integration is representative of the integral of said one variable voltage with respect to said second variable voltage.

2. A system for integrating one variable with respect to a second variable comprising means to integrate a constant quantity for an interval of time until the resultant integral is equal to an increment in said second variable, and means to integrate said first variable during said interval of time whereby the resultant integral is representative of the integral of said one variable with respect to said second variable.

3. A system for integrating a first variable with respect to a second variable comprising a first integrating means, means to oppose the output of said first integrating means with said second variable, means to apply a constant input to said first integrating means only for an interval required for the output of said first integrating means to become equal to said second variable, second integrating means, and means to apply said first variable to said second integrating means only for said interval whereby the resultant integral is representative of the integral of said first variable with respect to said second variable.

4. A system as recited in claim 3 wherein said means to apply a constant input to said first integrating means includes means to control the phase of said constant input to maintain said first integrating means output in opposition to said second variable responsive to the phase of the resultant of said opposed first integrating means output and said second variable.

5. A system as recited in claim 3 wherein said means to apply said first variable to said second integrating means includes means to change the phase of said applied first variable responsive to the phase of the resultant of said opposed first integrating means output and said second variable.

6. A system for integrating a first variable with respect to a second variable comprising means to establish first and second variable voltages respectively representative of said first and second variables, first and second integrating amplifiers each having a pair of inputs, one of each of said pairs of inputs including phase reversing means, each one of each of said pairs of inputs having a short circuiting means, means to apply said first variable voltage to the pair of inputs of said second integrating amplifier, means to apply a constant voltage to the pair of inputs of said first integrating amplifier, means to oppose the output of said first integrating amplifier with said second variable voltage to produce a resultant, and means to open one of said short circuiting means of each of said pairs of inputs responsive to the polarity of said resultant and for an interval required to eliminate said resultant whereby the output of said second integrating amplifier is representative of the integral of said first variable with respect to said second variable.

7. A system as recited in claim 6 wherein said short circuiting means for each of said pairs of inputs includes a normally closed relay and said means to open one of said short circuiting means of each of said pairs of inputs includes one diode connected to pass currents of one polarity between said means to oppose the output of said first integrating amplifier with said second variable voltage and the windings of one relay of each of said pairs of inputs, and a second diode connected to pass currents of opposite polarity between said means to oppose the output of said first integrating amplifier with said second variable voltage and the windings of the remaining relays in each of said pairs of inputs.

8. A system for integrating a first variable voltage with respect to a second variable voltage comprising first and second integrating amplifiers, each having a pair of inputs, one input of each of said pairs including phase reversing means, a normally closed relay for each input of said pairs of inputs, the normally closed contacts of each of said relays connecting its associated input to ground, means to apply said first variable voltage to the pair of inputs of said second integrating amplifier, means to apply a constant voltage to the pair of inputs of said first integrating amplifier, a summing amplifier having two inputs, one of said inputs being connected to said first integrating amplifier output, means to apply said second variable voltage to said other summing amplifier input to oppose said other input, a first diode connected to pass currents of one polarity between said summing amplifier output and the relay coils of said relays short circuiting said one of the inputs of each of said integrating amplifiers including phase reversing means, and a second diode connected to pass currents of opposite polarity between said summing amplifier output and the relay coils of the remaining ones of said relays, whereby in the presence of an output from said summing amplifier one relay in each of said pairs of inputs is operated to open its contacts and permit a properly phased input to be applied to said first and second integrating amplifiers until said summing amplifier input is substantially nullified when said relays are released.

9. A system for integrating one variable with respect to a second variable comprising means to produce switching signals for increments of time proportional to increments in successive values of said second variable, said signal producing means including feedback means having a switching means responsive to said switching signals and having an integrator, and means to integrate said first variable during said increments of time including a switching means responsive to said switching signals to provide outputs that are representative of the integral of said one variable with respect to said second variable.

10. A system comprising a first switching means, means to apply signals to be switched to said switching means, means to produce switching signals having time durations proportional to increments in a variable signal, and means to apply said switching signals to said first switching means to operate said switching means, said switching signal producing means including a feedback circuit having (1) an integrating means, (2) a second switching means to switch signals to be integrated to said integrating means, (3) means to compare the output of said integrating means and said variable signal and to produce said switching signals, and (4) means to apply said switching signals to said second switching means to operate said second switching means.

References Cited in the file of this patent

UNITED STATES PATENTS

| | | |
|---|---|---|
| 2,088,568 | Beecher | Aug. 3, 1937 |
| 2,137,133 | Dallmann | Nov. 15, 1938 |
| 2,261,655 | Lowe | Nov. 4, 1941 |
| 2,725,191 | Ham | Nov. 29, 1955 |

OTHER REFERENCES

Electrical Analoque Computing, Parts 2 and 4; Mynall; "Electronic Engineering," July and September 1947, pp. 214–217 and pp. 283–285, respectively.